United States Patent
Feng

(10) Patent No.: US 9,475,342 B2
(45) Date of Patent: Oct. 25, 2016

(54) WHEEL HUB, WHEEL HUB MOTOR WHEEL, AND ELECTRIC VEHICLE

(75) Inventor: Zhaoping Feng, Shenzhen (CN)

(73) Assignee: CHENGDU YOUYANG ELECTROMECHANICAL PRODUCT DESIGN CO., LTD., Chengdu (CN)

( * ) Notice: Subject to any disclaimer, the term of this patent is extended or adjusted under 35 U.S.C. 154(b) by 121 days.

(21) Appl. No.: 14/373,456

(22) PCT Filed: Jan. 20, 2012

(86) PCT No.: PCT/CN2012/070657
§ 371 (c)(1),
(2), (4) Date: Oct. 28, 2014

(87) PCT Pub. No.: WO2013/107040
PCT Pub. Date: Jul. 25, 2013

(65) Prior Publication Data
US 2015/0290970 A1   Oct. 15, 2015

(51) Int. Cl.
*B60B 3/08*   (2006.01)
*B60B 25/20*  (2006.01)
(Continued)

(52) U.S. Cl.
CPC ............. *B60B 25/20* (2013.01); *B60B 25/004* (2013.01); *B60B 25/08* (2013.01); *B60B 25/12* (2013.01);
(Continued)

(58) Field of Classification Search
CPC ........ B60K 7/0007; B60B 3/08; B60B 3/087
USPC .................................... 180/65.51; 301/95.11
See application file for complete search history.

(56) References Cited

U.S. PATENT DOCUMENTS

| 3,582,141 A * | 6/1971 | Kelsey, Jr. ................ B60B 3/12 |
| | | 152/403 |
| 3,831,658 A * | 8/1974 | Poplawski ................ B60B 3/08 |
| | | 152/396 |

(Continued)

FOREIGN PATENT DOCUMENTS

| CN | 200960827 | 10/2007 |
| CN | 102044932 | 5/2011 |

(Continued)

OTHER PUBLICATIONS

International search report of PCT/CN2012/070657, dated Nov. 1, 2012 (6 pages total).

*Primary Examiner* — Jeffrey J Restifo
(74) *Attorney, Agent, or Firm* — Hamre, Schumann, Mueller & Larson, P.C.

(57) ABSTRACT

A wheel hub includes a support ring (1). The support ring(1) includes an integrally formed inner wheel rim (11), a large span dual bearing support frame (12), and a rotor protection frame support groove (13). A lateral end of the support ring (1) is detachably provided with a tire quick replacing ring (2). The inner wheel rim (11) is provided with a first tire sealing face (101). The tire quick replacing ring (2) is provided with a second tire sealing face (201). A wheel hub motor wheel uses the above mentioned wheel hub. An electric vehicle uses the wheel hub motor wheel. Through the above wheel hub motor wheel and the electric vehicle, rapid replacement of a tire or rapid removal of the tire from the wheel hub for maintenance can be implemented without removing the wheel hub of the wheel from a vehicle body; this allows the replacement or maintenance of the tire to be time-saving, effort-saving, and greatly convenient. In addition, the wheel hub also provides a brake radius as large as possible and a maximized rotor space of an external rotor motor.

10 Claims, 4 Drawing Sheets

(51) Int. Cl.
   *B60B 25/12* (2006.01)
   *B60B 25/00* (2006.01)
   *B60B 25/08* (2006.01)
   *B60K 7/00* (2006.01)
   *B60B 25/22* (2006.01)

(52) U.S. Cl.
   CPC ............. *B60B 25/22* (2013.01); *B60K 7/0007* (2013.01); *B60B 2900/113* (2013.01); *B60K 2007/0038* (2013.01); *B60K 2007/0092* (2013.01)

(56) References Cited

U.S. PATENT DOCUMENTS

| | | | | |
|---|---|---|---|---|
| 4,021,690 A * | 5/1977 | Burton | ................ | B60C 23/041 180/65.51 |
| 4,054,322 A * | 10/1977 | Grawey | ................ | B60B 25/22 301/11.1 |
| 4,253,514 A * | 3/1981 | Imamura | ................ | B60B 25/22 152/379.3 |
| 4,330,045 A * | 5/1982 | Myers | ................ | B60K 7/0007 180/65.51 |
| 4,645,267 A * | 2/1987 | Weld | ................ | B60B 1/0215 29/894.324 |
| 4,799,564 A * | 1/1989 | Iijima | ................ | B60K 7/0007 180/65.51 |
| 4,856,849 A * | 8/1989 | Fujii | ................ | B60B 3/02 152/411 |
| 5,289,905 A * | 3/1994 | Braschler | ................ | F16D 65/04 180/65.51 |
| 6,148,941 A * | 11/2000 | Hinton | ................ | B60B 11/06 180/65.51 |
| 7,290,838 B2 * | 11/2007 | Handa | ................ | B60B 3/008 29/894.322 |
| 7,717,203 B2 * | 5/2010 | Yoshino | ................ | B60K 7/0007 180/65.51 |
| 7,779,877 B2 * | 8/2010 | Putz | ................ | B60B 3/16 152/396 |
| 2003/0080609 A1 * | 5/2003 | Darnell | ................ | B60B 5/02 301/95.11 |
| 2007/0290549 A1 * | 12/2007 | Zabaleta | ................ | B60B 3/002 301/95.11 |
| 2008/0018169 A1 * | 1/2008 | Yeh | ................ | B60B 3/087 301/64.301 |
| 2008/0202832 A1 * | 8/2008 | Ai | ................ | B60K 7/0007 180/65.51 |
| 2009/0039699 A1 * | 2/2009 | Liao | ................ | B60B 3/002 301/95.11 |
| 2009/0205764 A1 * | 8/2009 | Pionke | ................ | B60C 23/003 152/427 |
| 2009/0314562 A1 * | 12/2009 | Soderberg | ................ | B64C 25/36 180/65.51 |
| 2010/0147428 A1 * | 6/2010 | Lipper | ................ | B60B 3/08 152/399 |
| 2010/0163323 A1 * | 7/2010 | Pickholz | ................ | B60K 7/0007 180/65.51 |
| 2011/0057503 A1 * | 3/2011 | Marsaly | ................ | B60B 25/002 301/95.11 |
| 2012/0217788 A1 * | 8/2012 | Vallejo | ................ | B60K 7/0007 301/6.5 |
| 2012/0235465 A1 * | 9/2012 | Kuttner | ................ | B60B 5/02 301/64.302 |
| 2015/0076896 A1 * | 3/2015 | Werner | ................ | B60B 3/002 301/10.1 |
| 2015/0273938 A1 * | 10/2015 | Delayre | ................ | B60B 21/04 301/95.11 |
| 2015/0290970 A1 * | 10/2015 | Feng | ................ | B60B 25/004 301/6.5 |

FOREIGN PATENT DOCUMENTS

| | | |
|---|---|---|
| CN | 102256823 | 11/2011 |
| WO | 2007/051280 | 5/2007 |

* cited by examiner

WHEEL HUB, WHEEL HUB MOTOR WHEEL, AND ELECTRIC VEHICLE

TECHNICAL FIELD

The present invention relates to a vehicle manufacturing field, in particular, to a wheel hub, and a wheel hub motor wheel and an electric vehicle including the wheel hub.

BACKGROUND

Resources and environment is the eternal theme of social development. As a carrier of the "green traffic", the electric car plays an increasingly important role in the harmonious development of resources and environment.

The wheel hub driving system is the advanced drive way for the electric vehicle, the system may be flexibly disposed in the front wheel, the rear wheels, even all the wheels of all kinds of electric vehicle, and can directly drive the wheel hub to rotate. The wheel hub driving system mainly includes a motor and wheels, compared with the driving mode of the traditional internal combustion engine, single motor and so on, the wheel hub driving system has technical advantage of simple driving system, high transmission efficiency, convenient control and high energy efficiency.

However, in the wheel hub driving system, the motor is accommodated in the wheel hub, such that the weight of the whole wheel is large. When the tire of the wheel has a problem and needs maintenance or replacement, if the whole wheel is removed from the vehicle body like the traditional wheel, it will lead a slow and difficult operation.

SUMMARY

The present invention aims at providing a wheel hub, such that rapid replacement of a tire or rapid removal of the tire from the wheel hub for maintenance can be implemented without removing the wheel hub of the wheel from a vehicle body.

To solve the technical problem, the present invention uses a technical solution of a wheel hub, the wheel hub includes a support ring, the support ring includes an integrally formed inner wheel rim, a large span dual bearing support frame, and a rotor protection frame support groove, a lateral end of the support ring is detachably provided with a tire quick replacing ring, the inner wheel rim is provided with a first tire sealing face, the tire quick replacing ring is provided with a second tire sealing face.

Furthermore, the support ring is provided with a plurality of connecting screw holes, the tire quick replacing ring is correspondingly provided with a plurality of tire quick replacing ring mounting holes, the tire is fixed to the support ring through a plurality of fixing bolts.

Furthermore, a sealing ring is disposed between the tire quick replacing ring and the support ring.

Furthermore, an inner wall of the support ring is further provided with a V-shaped braking groove.

Furthermore, the support ring is further provided with a plurality of fixing screw holes of bearing thrust piece.

Furthermore, the support ring is further provided with a wind pressure water proofing ring disposed on the periphery of the large span dual bearing support frame.

Furthermore, the inner wheel rim is further provided with a tire pressure collection opening.

Furthermore, the inner wheel rim is further provided with an inflating hole.

The technical problem to be solved in the present invention is further to provide a wheel hub motor wheel comprising a tire and a driving motor, the wheel hub motor wheel further includes the above mentioned wheel hub, the tire is disposed on the wheel hub, and the driving motor is accommodated in the wheel hub.

The technical problem to be solved in the present invention is further to provide an electric vehicle comprising a vehicle body and a wheel, the wheel is the wheel hub motor wheel mentioned above.

Compared with the prior art, the wheel hub of the present invention has the beneficial effect that: the wheel hub include the support ring and the tire quick replacing ring which may be detached from the support ring, when the tire is damaged and needs replacement or removal of the tire from the wheel hub for maintenance, it is only need to remove the tire quick replacing ring from the lateral end of the support ring, then the tire is removed directly and quickly, which can eliminate the time-consuming and hard sledding trouble existing in the traditional wheel hub that the wheel hub and the tire need to be removed from the vehicle body together; this allows the replacement or maintenance of the tire to be greatly convenient. In addition, the wheel hub also provides a brake radius as large as possible and a maximized rotor space of an external rotor motor.

Compared with the prior art, the wheel hub motor wheel of the present invention has the beneficial effect that: the wheel hub motor wheel of the present invention uses the wheel hub mentioned above, when the tire needs maintenance or replacement, through the tire quick replacing ring, rapid disassembly or assembly of the tire can be implemented without removing the whole wheel hub motor wheel from the vehicle body; this operation is time-saving, effort-saving, and greatly convenient.

Compared with the prior art, the electric vehicle of the present invention has the beneficial effect that: because the electric vehicle of the present invention uses the wheel hub motor wheel mentioned above, when the tire of the electric vehicle needs maintenance or replacement, through the tire quick replacing ring, rapid disassembly or assembly of the tire can be implemented without removing the whole wheel hub motor wheel from the vehicle body; this operation is time-saving, effort-saving, and greatly convenient. In addition, the electric vehicle has technical advantage of simple driving system, high transmission efficiency, convenient control and high energy efficiency.

DETAILED DESCRIPTION

Figure 1:
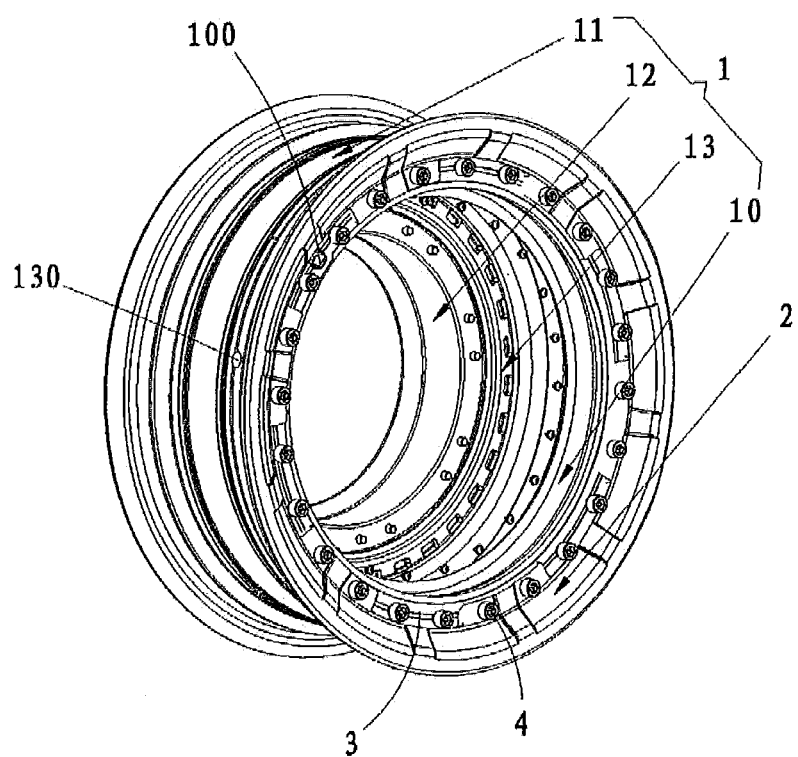
FIG. 1 is a schematic three-dimensional structure view according to the wheel hub of an embodiment of the present invention.
Figure 2:
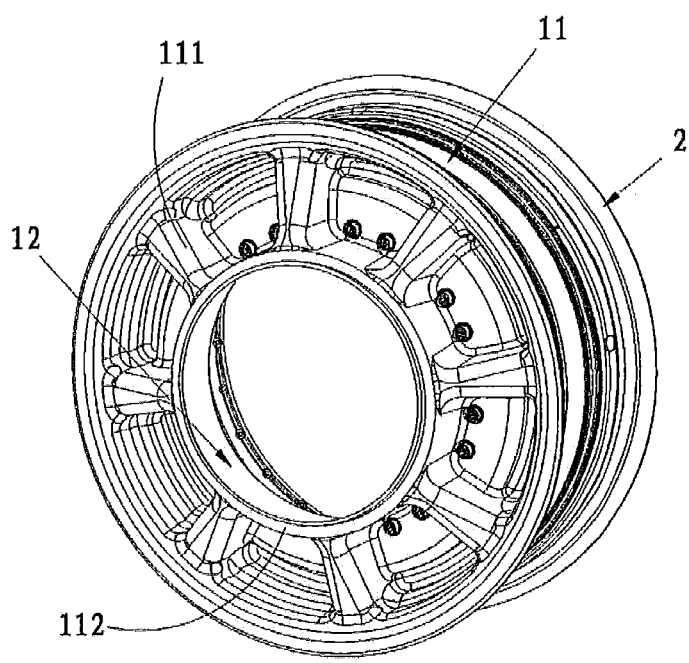
FIG. 2 is a schematic three-dimensional structure view according to the wheel hub of the embodiment of the present invention.

To make the objectives, technical solutions and advantages of the present invention clearer, the present invention will be further described hereinafter with reference to the accompany drawings and embodiments. It shall be understood that, the embodiments described herein are only intended to illustrate but not to limit the present invention.

Referring to FIG. 1 to FIG. 8, the wheel hub of the present invention is described further. The wheel hub includes a support ring 1. The support ring 1 includes an integrally formed inner wheel rim 11, a large span dual bearing support frame 12, and a rotor protection frame support groove 13. A lateral end of the support ring 1 is detachably provided with a tire quick replacing ring 2. The inner wheel rim 11 is provided with a first tire sealing face 101. The tire quick replacing ring 2 is provided with a second tire sealing face 201. The inner wheel rim 11 is configured to support the tire, the large span dual bearing support frame 12 is configured to be installed a steel sleeve on the inner side thereof, such that a ball may be support, to improve the life and bearing capacity of the inner wheel rim, and the running accuracy and steadiness of the rotor in the vibration environment is ensured, it is convenient for installation and maintenance. The rotor protection frame support groove 13 is configured to be installed a supporting bar therein, to protect the discrete type rotor in the vibration environment to operate stably and have a minimal magnetic loss.

The wheel hub of the present invention includes the support ring 1 and the tire quick replacing ring 2 which may be detached from the support ring, when the tire is damaged and needs replacement or removal of the tire from the wheel hub for maintenance, it is only need to remove the tire quick replacing ring from the lateral end of the support ring, then the tire is removed directly and quickly, which can eliminate the time-consuming and hard sledding trouble existing in the traditional wheel hub that the wheel hub and the tire need to be removed from the vehicle body together; this allows the replacement or maintenance of the tire to be greatly convenient. The tire quick replacing ring 2 is the special structure for assembling and disassembling the wheel hub motor tire, greatly changes the structure of the traditional wheel hub, and is a key technology of the commercial application of the wheel hub motor.

Figure 7:
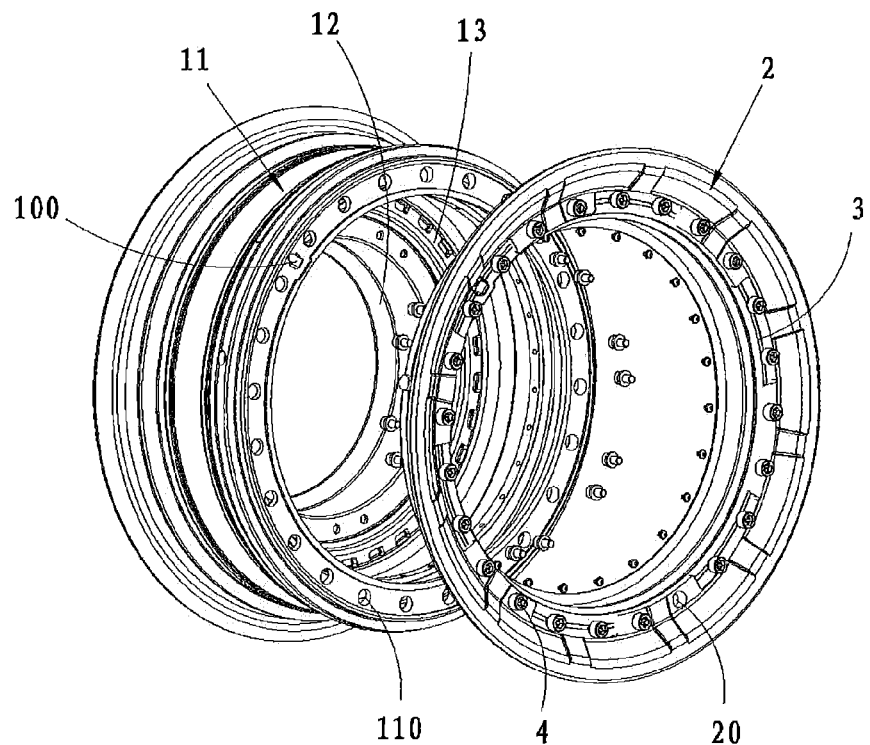
FIG. 7 is a schematic explosive structure view according to the wheel hub of the embodiment of the present invention.

Furthermore, referring to FIG. 1 and FIG. 7, as a specific embodiment of the wheel hub of the present invention, the support ring 1 is provided with a plurality of connecting screw holes 110, the tire quick replacing ring 2 is correspondingly provided with a plurality of tire quick replacing ring mounting holes 20, the tire is fixed to the support ring 1 through a plurality of fixing bolts 4. After the tire quick replacing ring 2 is connected onto the support ring 1 through the fixing bolts 4, the tire quick replacing ring 2 has a stable structure. To remove the tire, it is only needed to remove the fixing bolts 4 and then take off the tire quick replacing ring 2 from the support ring 1 to remove the tire from one end of the support ring 1, this operation is quick and convenient.

Figure 5:
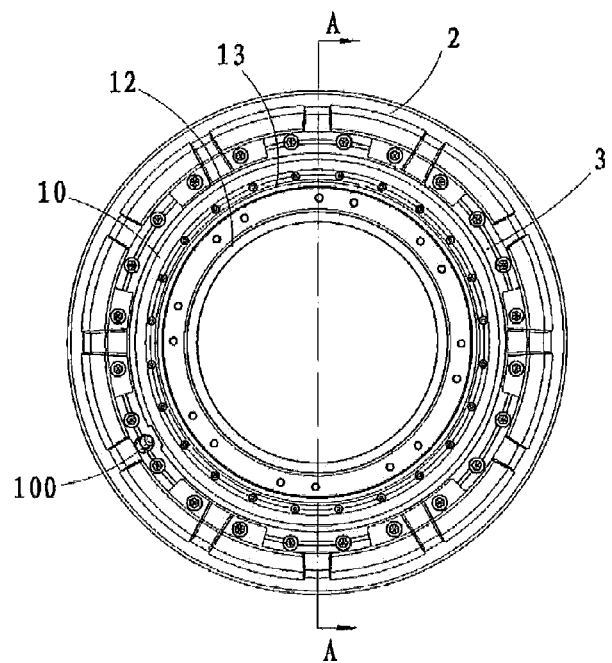
FIG. 5 is a schematic rear structure view according to the wheel hub of the embodiment of the present invention.

Furthermore, referring to FIG. 1, FIG. 5 and FIG. 7, as a specific embodiment of the wheel hub of the present invention, a sealing ring 3 is disposed between the tire quick replacing ring 2 and the support ring 1. The sealing ring 3 may prevent a gap from existing between the tire quick replacing ring 2 and the support ring 1, which can achieve a sealing effect to avoid water leakage and air leakage.

Figure 6:
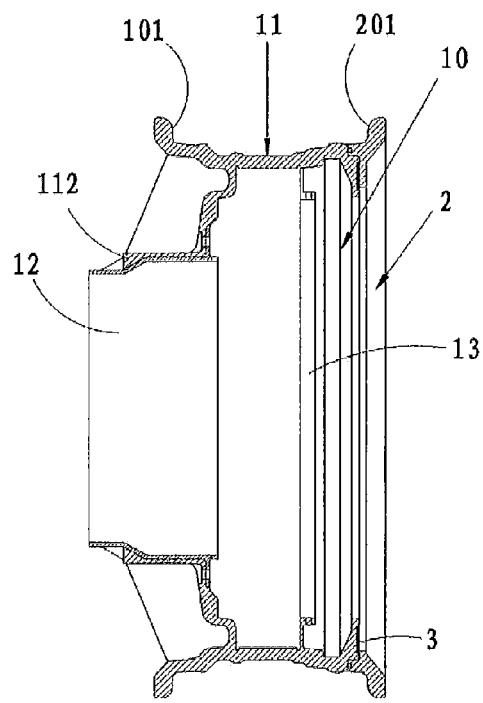
FIG. 6 is a schematic profile structure view along A-A line in FIG. 5.

Furthermore, referring to FIG. 1, FIG. 5 and FIG. 6, as a specific embodiment of the wheel hub of the present invention, an inner wall of the support ring 1 is provided with a V-shaped braking groove 10. In this embodiment, the V-shaped braking groove 10 may be disposed on the outer side of the rotor protection frame support groove 13 near the tire quick replacing ring 2, and is configured to support a movable brake lining and an axial fixing frame of the rotor. As the aluminum alloy die casting process is adapted for the movable brake frame, the braking heat of the movable brake lining can quickly disperse through the movable brake frame and the V-shaped braking groove 10, which avoids the adhesion of the brake lining, and improves the service life and safety of the brake. In addition, the V-shaped braking groove 10 can increase the positive pressure between the brake lining and the V-shaped braking groove 10, and the friction between the brake lining and the V-shaped braking groove 10 is increased during braking. Meanwhile, the V-shaped braking groove 10 is disposed on the inner side wall of the support ring 1, which provides a maximized rotor space of an external rotor motor, and increases the brake radius, such that the brake torque is increased during braking and the brake performance of the vehicle is improved. In addition, this also provides a space to appropriately increase the diameter of the motor in wheel hub, which can improve the life and stability of the wheel hub and the motor.

Figure 3:
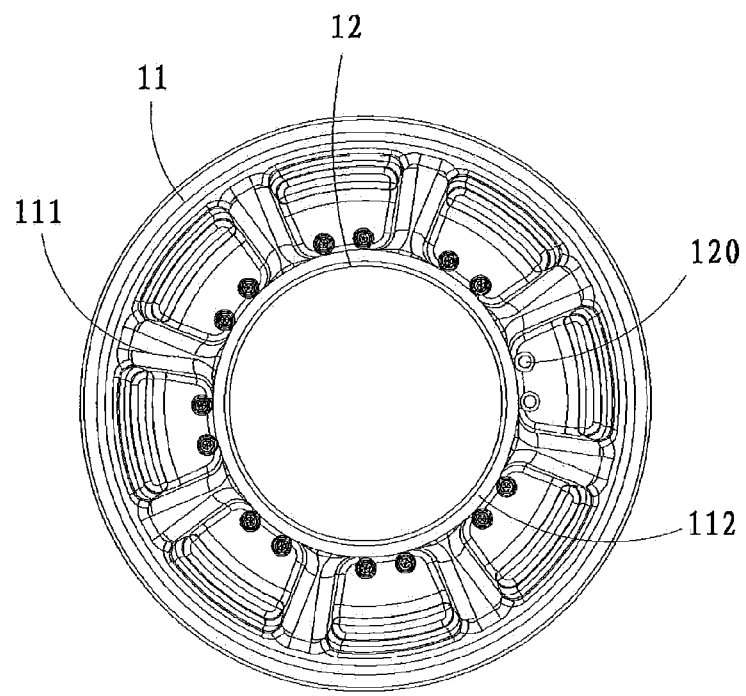
FIG. 3 is a schematic front structure view according to the wheel hub of the embodiment of the present invention.
Figure 8:
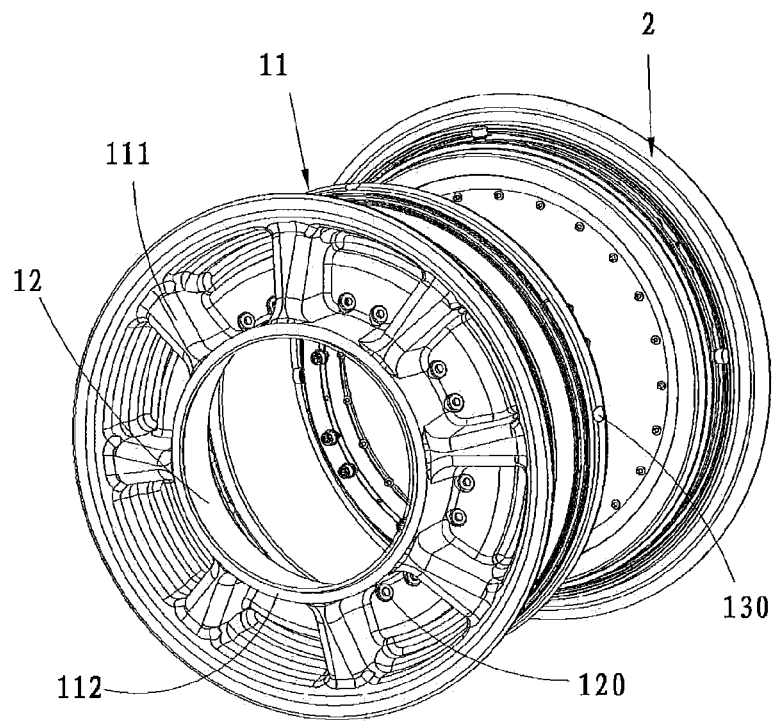
FIG. 8 is another schematic explosive structure view according to the wheel hub of the embodiment of the present invention.

Furthermore, referring to FIG. 3 and FIG. 8, as a specific embodiment of the wheel hub of the present invention, the support ring 1 is further provided with a plurality of fixing screw holes 120 of bearing thrust piece configured to provide a bearing thrust kinetic energy of a large span bearing.

Furthermore, referring to FIG. 2, FIG. 3, FIG. 6 and FIG. 8, as a specific embodiment of the wheel hub of the present invention, the support ring 1 is further provided with a wind pressure water proofing ring 112 disposed on the periphery of the large span dual bearing support frame 12. The wind pressure water proofing ring 112 can use the air pressure generated by a cooling fan in a supporting axle to prevent the infiltration of tiny water droplets.

Figure 4:
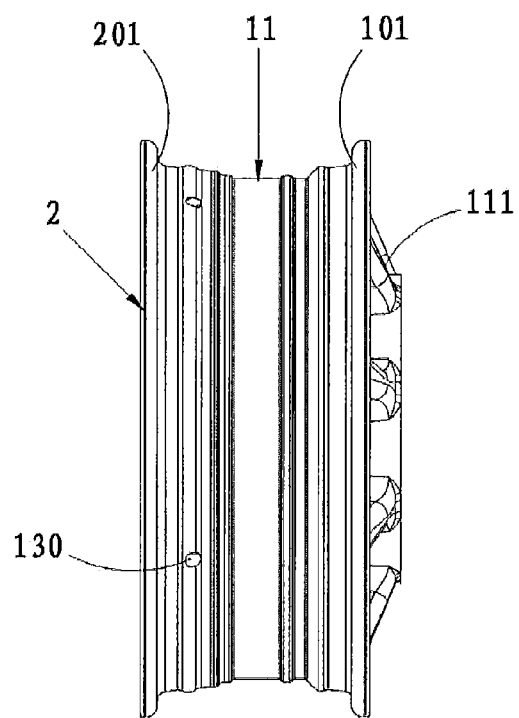
FIG. 4 is a schematic left side structure view according to the wheel hub of the embodiment of the present invention.

Furthermore, referring to FIG. 1, FIG. 4, and FIG. 8, as a specific embodiment of the wheel hub of the present invention, the inner wheel rim 11 is further provided with a tire pressure collection opening 130. The air pressure in the tire in operation may be collected through the tire pressure collection opening 130, a real time detection of the air pressure in the tire may be achieved, in order to timely blow up the tire when needed and increase the life of the tire.

Furthermore, referring to FIG. 1, FIG. 5, and FIG. 7, as a specific embodiment of the wheel hub of the present invention, the inner wheel rim 11 is further provided with an inflating hole 100. The tire may be blown up through the inflating hole 100.

The present invention also provides a wheel hub motor wheel (not shown). A wheel hub motor wheel includes a tire and a driving motor, and further includes the wheel hub mentioned above, the tire is disposed on the wheel hub, and the driving motor is accommodated in the wheel hub. The driving motor may be a permanent magnet motor (PM), induction motor (IM), switched reluctance motor (SRM), transverse flux motor (TFM); In general, the permanent magnet motor is the first selection, the permanent magnet motor is with simple structure, and small volume; If a low speed and high torque driving is needed, the transverse flux motor may be chosen.

For the wheel hub motor wheel of the present invention, the wheel hub motor wheel of the present invention uses the wheel hub mentioned above, when the tire needs maintenance or replacement, through the tire quick replacing ring, rapid disassembly or assembly of the tire can implemented without removing the whole wheel hub motor wheel from the vehicle body; this operation is time-saving, effort-saving, greatly convenient.

The present invention also provides an electric vehicle (not shown). The electric vehicle includes a vehicle body and a wheel, the wheel is the wheel hub motor wheel mentioned above. This electric vehicle may be provided electricity through the solar energy, an accumulator, a fuel battery or other power supply.

The electric vehicle of the present invention uses the wheel hub motor wheel mentioned above, the tire of the electric vehicle needs maintenance or replacement, the tire quick replacing ring, rapid disassembly or assembly of the tire can implemented without removing the whole wheel hub motor wheel from the vehicle body; this operation is time-saving, effort-saving, and greatly convenient. In addition, the electric vehicle has technical advantage of simple driving system, high transmission efficiency, convenient control and high energy efficiency.

What described above are only preferred embodiments of the present disclosure but are not intended to limit the scope of the present disclosure, any modifications, equivalent replacements and improvements etc. made within the spirit and principle of the present invention, should be included in the protection scope of the present invention.

What is claimed is:

1. A wheel hub, comprising:
   a support ring; and
   a tire quick replacing ring,
   wherein the support ring comprises an inner wheel rim, a large span dual bearing support frame, and a rotor protection frame support groove,
   the inner wheel rim, the large span dual bearing support frame, and the rotor protection frame support groove are integrally formed,
   the tire quick replacing ring is directly and detachably connected to a lateral end of the inner wheel rim, and
   the inner wheel rim is provided with a first tire sealing face, and the tire quick replacing ring is provided with a second tire sealing face.

2. The wheel hub of claim 1, wherein the lateral end of the support ring is provided with a plurality of connecting screw holes, the tire quick replacing ring is correspondingly provided with a plurality of tire quick replacing ring mounting holes, and the tire is fixed to the support ring through a plurality of fixing bolts.

3. The wheel hub of claim 1, wherein a sealing ring is disposed between the tire quick replacing ring and the support ring.

4. The wheel hub of claim 1, wherein an inner wall of the support ring is further provided with a V-shaped braking groove.

5. The wheel hub of claim 1, wherein the support ring is further provided with a plurality of fixing screw holes of bearing thrust piece.

6. The wheel hub of claim 1, wherein the support ring is further provided with a wind pressure water proofing ring disposed on the periphery of the large span dual bearing support frame.

7. The wheel hub of claim 1, wherein the inner wheel rim is further provided with a tire pressure collection opening.

8. The wheel hub of claim 1, wherein the inner wheel rim is further provided with an inflating hole.

9. A wheel hub motor wheel comprising a tire and a driving motor, wherein the wheel hub motor wheel further comprises the wheel hub of claim 1, the tire is disposed on the wheel hub, and the driving motor is accommodated in the wheel hub.

10. An electric vehicle comprising a vehicle body and a wheel, wherein the wheel is the wheel hub motor wheel of claim 9.

* * * * *